(12) United States Patent
Cernasov

(10) Patent No.: US 7,382,544 B2
(45) Date of Patent: Jun. 3, 2008

(54) DEVICES AND RELATED METHODS FOR LIGHT DISTRIBUTION

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 79 days.

(21) Appl. No.: 11/350,952

(22) Filed: Feb. 10, 2006

(65) Prior Publication Data

US 2007/0188882 A1 Aug. 16, 2007

(51) Int. Cl.
*G02B 1/06* (2006.01)
(52) U.S. Cl. .................................... 359/666; 359/665
(58) Field of Classification Search ................ 359/665, 359/666
See application file for complete search history.

(56) References Cited

U.S. PATENT DOCUMENTS

| | | | |
|---|---|---|---|
| 3,600,063 A * | 8/1971 | Bowen ....................... 359/626 |
| 5,280,371 A | 1/1994 | McCartney, Jr. et al. |
| 5,303,322 A | 4/1994 | Winston et al. |
| 6,369,954 B1 | 4/2002 | Berge et al. |
| 6,538,823 B2 | 3/2003 | Kroupenkine et al. |
| 6,545,815 B2 | 4/2003 | Kroupenkine et al. |
| 6,545,816 B1 | 4/2003 | Kroupenkine et al. |
| 6,603,444 B1 | 8/2003 | Kawanami et al. |
| 6,618,206 B2 | 9/2003 | Tarakci et al. |
| 6,661,558 B2 | 12/2003 | Toor et al. |
| 6,674,940 B2 | 1/2004 | Kroupenkine |
| 6,702,483 B2 | 3/2004 | Tsuboi et al. |
| 6,778,328 B1 | 8/2004 | Aizenberg et al. |
| 6,806,988 B2 | 10/2004 | Onuki et al. |
| 6,829,415 B2 | 12/2004 | Kroupenkine et al. |
| 6,847,493 B1 | 1/2005 | Davis et al. |
| 2002/0196558 A1 | 12/2002 | Kroupenkine et al. |
| 2003/0048541 A1 | 3/2003 | Kroupenkine et al. |
| 2003/0202256 A1 | 10/2003 | Bao et al. |
| 2003/0206351 A1 | 11/2003 | Kroupenkine |
| 2003/0227100 A1 | 12/2003 | Chandross et al. |
| 2005/0002112 A1 | 1/2005 | Kroupenkine |
| 2005/0088754 A9 | 4/2005 | Kroupenkine |
| 2005/0113912 A1 | 5/2005 | Feenstra et al. |

(Continued)

OTHER PUBLICATIONS

Computer printout of "Vari-Angle Prism (VAP)," *Canon Milestone: The Canon Story* from http://www.camera.canon.com.my/milestone/optical.htm, 2 pages, printed Dec. 8, 2005.

(Continued)

*Primary Examiner*—William C Choi
(74) *Attorney, Agent, or Firm*—Ingrassia Fisher & Lorenz

(57) ABSTRACT

A device for distributing light may comprise a plurality of liquid optical lenses comprising at least one liquid. Each liquid optical lens may have a configuration that is based on a pressure associated with the at least one liquid and the pressure may be selectively modulatable so as to selectively alter the configuration of each lens and alter a distribution pattern of transmitted light relative to incident light. A method for distributing light may comprise transmitting incident light through a plurality of liquid optical lenses comprising at least one liquid. The method may further comprise selectively modulating a pressure associated with the at least one liquid in the plurality of liquid optical lenses so as to alter a configuration of each lens and a distribution pattern of the transmitted light.

23 Claims, 8 Drawing Sheets

U.S. PATENT DOCUMENTS

2006/0164731 A1* 7/2006 Wu et al. .................... 359/666
2006/0274425 A1* 12/2006 Kuiper et al. ............... 359/665
2007/0211207 A1* 9/2007 Lo et al. ...................... 351/41

OTHER PUBLICATIONS

Computer printout of "AMS-1000 Tunable lens unit" from Varioptic, http://216.239.39.104/translate_c?hl=en&u=http://www.varioptic.com/en/PAMS-1000.php&prev=/search%3Fq%3DAMS-1000%2Btunable%2Blens%26start%3D10%26hl%3Den%26lr%3-D%26sa%3DN, 3 pages, printed Dec. 8, 2005.

Sharke et al., "water, paper, glass," *mechanical engineering*, computer printout of http://www.memagazine.org/backissues/may04/features/wpglass/wpglass.html, 6 pages, printed Dec. 8, 2005, article dated May 2004.

* cited by examiner

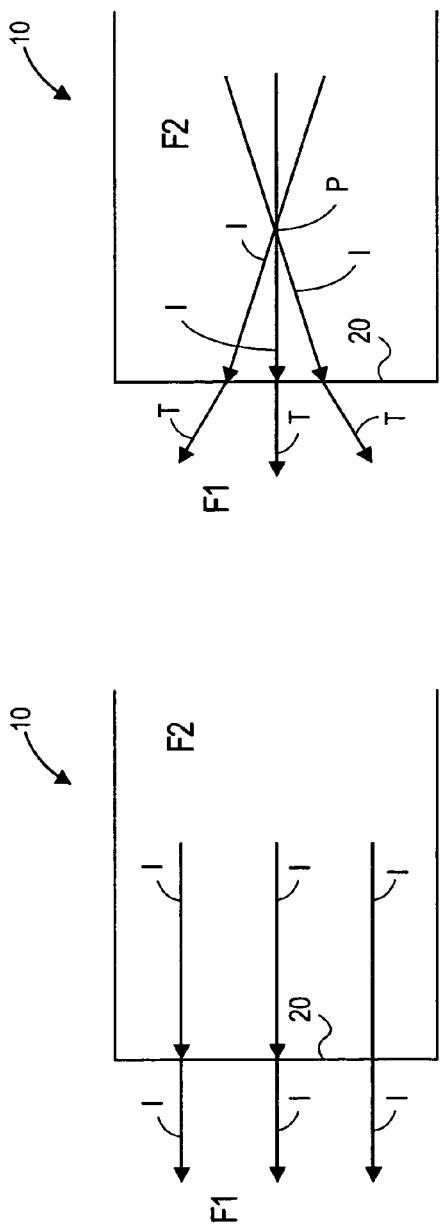
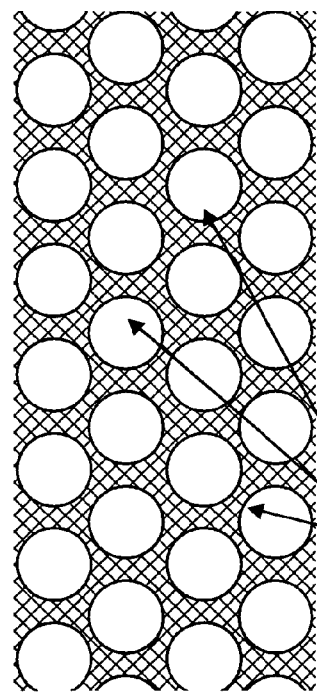

DEVICES AND RELATED METHODS FOR LIGHT DISTRIBUTION

TECHNICAL FIELD

This invention relates to devices and related methods for altering the distribution of light. More particularly, the invention relates to devices and methods that utilize deformable lenses, for example, liquid optical lenses, to alter the distribution of light.

BACKGROUND

Liquid crystal display (LCD) panels are typically illuminated via backlight systems. Such backlight systems may comprise a light source and a diffuser for distributing light from the light source at a substantially constant luminance (e.g., brightness) over a range of viewing angles. Typically, backlight systems used to illuminate LCD panels distribute light in a fixed output pattern to the LCD panel. The output light pattern may differ for differing backlight system configurations. For example, the light distribution pattern may be optimized for on-axis viewing (e.g., viewing from a substantially normal direction to the LCD panel) by using a narrower angular distribution. Alternatively, for off-axis viewing (e.g., viewing from a direction at an angle, either vertical or horizontal, to the normal axis of the LCD panel) a wider angular distribution may be used.

Conventional backlight systems do not, however, permit selective variation (e.g., selective modulation) of the output light distribution pattern. In other words, conventional backlight systems are not tunable in the sense that the output light pattern may be altered as desired (e.g., selectively altered by a user). As such, when one type of viewing is desired, the LCD panel may be provided with a first filtering mechanism, such as an overlay screen. However, when a different light distribution pattern is desired, then a completely different filtering mechanism configuration is required.

In many applications, including, for example, aeronautical and combat settings, it may be desirable to control the illumination of a display element, such as, an LCD panel, and allow viewing of the display element over a range of viewing angles (both narrow and wide). By way of example, in some circumstances it may be desirable that an image from a LCD panel be viewed only by a single viewer or viewers (e.g., a pilot, military personnel, etc) sitting at a particular angle relative to the LCD panel, for example, substantially in alignment with the normal axis to the LCD panel. In other circumstances, it may be desirable that an image from a LCD panel be viewed by viewers that are positioned across a wide angle of view relative to the normal axis of the LCD panel. For the former situation, it may therefore be desirable to provide an output light pattern that is substantially focused in a relatively narrow angular range for on-axis viewing, while for the latter situation, it may be desirable to provide a wider angle distribution of the output light pattern.

In order to permit the light from an LCD panel or other light source to be substantially focused to a relatively narrow range of angles or to be distributed over a wider range of viewing angles, it may be desirable to permit an output light distribution pattern to be selectively modulated. For example, it may be desirable to permit a user of an LCD panel to selectively vary the distribution pattern of light transmitted from the LCD panel to vary from a relatively narrow angular range of distribution to a relatively wider angular range of distribution. For example, it may be desirable to permit the output light pattern of a backlight system to vary from a strong on-axis illumination distribution pattern to a substantially isotropic distribution pattern. It may also be desirable to permit variation of the output light pattern without having to remove and/or replace filtering mechanisms associated with an LCD panel or other display element or light source.

Further, it may be desirable to provide a light distribution device configured for selective variation of an output light distribution pattern for use with other applications in which it may be desirable to vary the light distribution pattern, including an angular light distribution pattern. It also may be desirable to provide a light distribution device configured for automated selective variation of an output light distribution pattern.

SUMMARY

The present invention may satisfy one or more of the above-mentioned desirable features set forth above. Other features and advantages will become apparent from the detailed description which follows.

In accordance with exemplary embodiments, a tunable light distribution device may be provided that permits selective modulation of the output distribution pattern of light from a source, such as, for example, transmissive display elements, including, for example, LCD panels, plasma monitors, and cathode ray tube (CRT) monitors, backlights, flashlights, light emitting diodes (LEDs), organic light emitting diodes (OLEDs), incandescent light sources, and/or other sources for which it may be desirable to alter a distribution pattern (e.g., an angular distribution) of light. In exemplary embodiments, a tunable light distribution device may comprise a plurality (e.g., an array) of deformable lenses configured so as to permit alteration of the shape (e.g., concavity or convexity) of the lens.

By selectively altering the shape of the lenses, for example, substantially simultaneously altering each lens shape, light incident to the device may be transmitted over a relatively narrow range of angles (e.g., substantially focused) or over a relatively wide range of angles (e.g., substantially isotropic) as desired. Although some of the embodiments described herein are described for use with a LCD panel, it should be understood that the light distribution devices may be used in a variety of applications and in conjunction with virtually any application (e.g., light source) in which it may be desirable to tune (e.g., selectively modulate) an output light distribution pattern.

As used herein, "selectively modulate," "selectively alter", and/or "selectively vary," may refer to the ability to control the modulation, alteration, or variation, as desired, within a given device. In other words, for example, devices and methods that selectively vary the distribution pattern of transmitted light may be tunable such that a desired distribution pattern may be selected by an individual from among various distribution patterns and the pattern may be adjusted accordingly. Thus, in contrast to some conventional light distribution devices and methods used in conjunction with backlight systems for LCD panels, for example, light distribution devices and methods capable of selectively altering a distribution pattern of transmitted light do not have a predetermined, fixed distribution pattern that is a function of a particular, set configuration.

According to an exemplary aspect, as embodied and broadly described herein, a device for distributing light may comprise a plurality of liquid optical lenses comprising at least one liquid. Each liquid optical lens may have a configuration that is based on a pressure associated with the at least one liquid and the pressure may be selectively modulatable so as to selectively alter the configuration of each lens and alter a distribution pattern of transmitted light relative to incident light.

According to another exemplary aspect, a method for distributing light may comprise transmitting incident light through a plurality of liquid optical lenses comprising at least one liquid. The method may further comprise selectively modulating a pressure associated with the at least one liquid in the plurality of liquid optical lenses so as to alter a configuration of each lens and a distribution pattern of the transmitted light.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The drawings of this application illustrate exemplary embodiments and, together with the description, serve to explain certain principles. The teachings are not limited to the embodiments depicted in the drawings, but rather include equivalent structures and methods as set forth in the following description and as would be known to those of ordinary skill in the art in view of the teachings herein. Where possible, like reference numerals are used to represent like parts. In the drawings:

FIGS. 1A-1F show schematic illustrations of various output light patterns from various shaped lenses and incident light patterns;

FIG. 2 is a partial top view of a light distribution device according to an exemplary embodiment;

DETAILED DESCRIPTION

Figure 1A:
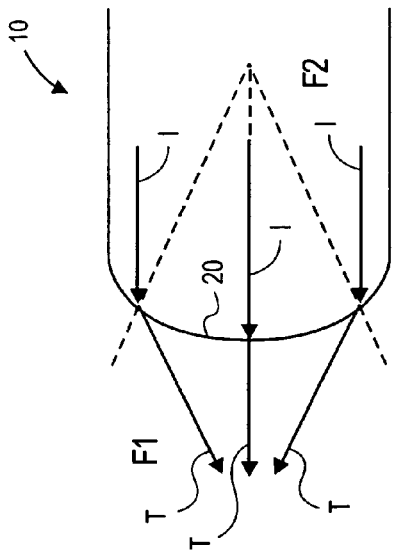

Various exemplary embodiments of the present invention provide methods and devices that allow for the selective modulation of the light distribution pattern emanating from a source, such as, for example, a display element including but not limited to an LCD, a plasma monitor, a projection monitor, a CRT monitor, an LED display, and an OLED display, and/or light sources such as backlights, incandescent light sources, LEDs, OLEDs, fluorescent light sources, and/or other types of sources that generate or transmit light. A plurality of deformable lenses is used to modify the light distribution pattern. In some embodiments, the deformable lenses may be constructed using liquid optics. The optical characteristics in these lenses may be controlled by modulating pressures associated with one or more liquids to achieve a desired light distribution pattern. Accordingly, a user may, based on a desired distribution pattern, selectively modulate the distribution of the light so as to achieve optimal viewing.

Reference will now be made in detail to exemplary embodiments of the invention, which are illustrated in the accompanying drawings. Wherever possible, the same reference numbers will be used throughout the drawings to refer to the same or like parts.

FIGS. 1A-1F schematically depict various configurations of deformable lenses and the effect those lens configurations have on the distribution pattern of incident light through the lens. According to some exemplary embodiments, deformable lens 10 may comprise a first fluid F1 and a second fluid F2. The first fluid F1 may be a liquid or a gas, and the second fluid F2 may be a liquid or a gas that is substantially immiscible with the first fluid F2. Typically, at least the second fluid F2 is a liquid. An interface (e.g., a meniscus) 20 may be formed between the first fluid F1 and the second fluid F2 through which incident light may be transmitted. Alternatively, the first fluid F1 and second fluid F2 may be separated from each other by a transparent, flexible (e.g., deformable) membrane, which may serve as interface 20. Such a membrane may be made, for example, of polymer-polymer composites, a polyurethane film, such as latex, for example, and/or lipid layers. A membrane may be particularly useful to separate the fluids if the first fluid F1 is a gas and the second fluid F2 is a liquid.

According to various exemplary embodiments, the first fluid F1 and the second fluid F2 in deformable lens 10 may both be substantially clear, immiscible liquids. To create a lens effect based on refraction of the incident light I, the first liquid F1 may have a relatively low index of refraction and the second liquid F2 may have a relatively high index of refraction. One of ordinary skill in the art will also understand that any number of liquids (e.g., more than 2) may be employed in embodiments of the present invention.

For the purposes of this disclosure, the liquids used in creating the various deformable lenses may have viscosities ranging from viscosities typical of liquids to viscosities typical of semi-solids, such as, for example, gels. By way of example only, the first fluid F1 may be a liquid having a relatively low viscosity and the second fluid F2 may be a liquid having a relatively high viscosity. For example, the first fluid F1 may be water, which has a viscosity of about 0.01 Poise, and the second fluid F2 may be an oil having a viscosity ranging, for example, from about 1.1 Poise to about 7 Poise. Gels may also be used, which have viscosities as high as about 170 Poise. Also, in lieu of oil, it may be possible to use benzene and/or acetones. In various other exemplary embodiments, the first fluid F1 may be a gas. In such embodiments, the gas should be sealed within the lens and the volume of the gas should be such that the second fluid F2, which may be a liquid, is substantially hindered from evaporating into the gas (e.g., the volume should be small enough to hinder such evaporation). For example, with reference to the devices 300 and 600 of FIGS. 3 and 6, described in more detail below, rather than the tubes 315 and 615 opening to a reservoir of the gas F1, the ends 330 and 630 of the tubes 315 and 615 may be sealed to trap the gas F1 in the end portion of the tubes 315 and 615. Alternatively or additionally, a membrane, as discussed above, may be provided between the gas F1 and the second fluid F2 to hinder evaporation of the liquid F2 into the gas.

As used herein, therefore, the term liquid optical lens may refer to an optical lens formed by at least one liquid that at least in part defines an interface, whether in contact with another liquid, a gas, or a membrane, that may take on a lens configuration and may transmit light therethrough.

Figure 1B:
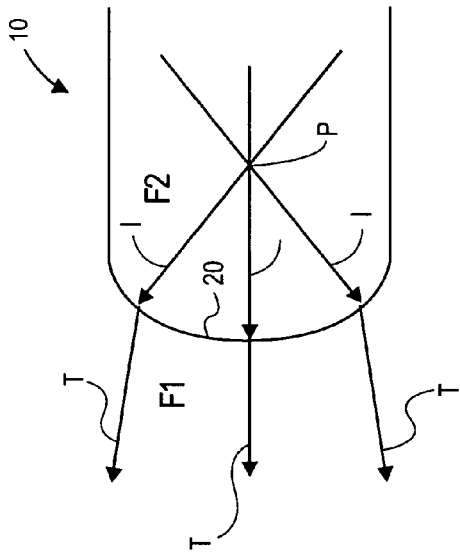

With reference to FIG. 1A, the interface 20 of lens 10 has a convex configuration relative to the transmitted light T. In other words, the surface of interface 20 facing in a direction of the transmitted light T is convex. For substantially parallel incident light I entering the interface 20, the lens 10 thus refracts the transmitted light T toward a central portion of the lens 10, as depicted in FIG. 1A. FIG. 1B shows a depiction of the light distribution pattern from a convex lens configuration in which a point source P creates the incident light I. As shown in FIG. 1B, the light T transmitted through the interface 20 tends to bend inwardly relative to the direction of incident light I. As can be seen from FIGS. 1A and 1B, therefore, the convex lens configuration tends to focus incident parallel rays of light and gather (e.g., make more parallel) rays generated from a point source of light. In either case, there is a narrowing (tightening) of the angular distribution of the transmitted light T relative to the incident light I.

Figure 1C:
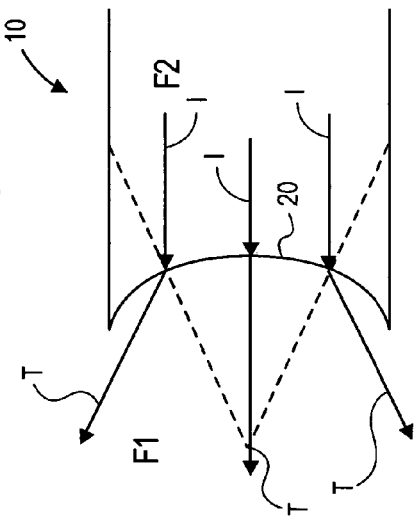
Figure 1D:
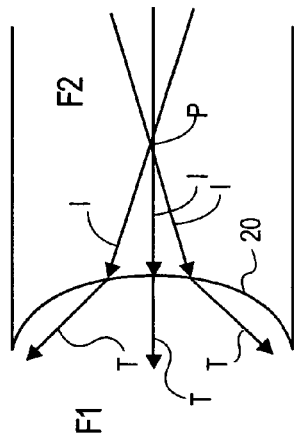

FIGS. 1C and 1D depict the effect on light distribution patterns when incident light is transmitted through a lens having a concave configuration relative to the transmitted light T. In other words, in FIGS. 1C and 1D, the surface of the interface 20 facing in a direction of the transmitted light T is concave. As shown in both FIGS. 1C and 1D, the concave interface 20 of the lens 10 tends to spread out the transmitted light T outwardly, whether the incident light I is parallel (as shown in FIG. 1C) or from a point source P (as shown in FIG. 1D). Thus, in contrast to the convex lens configuration of FIGS. 1A and 1B, the concave lens configuration of FIGS. 1C and 1D tends to spread the light over a wider angular range, making the transmitted light T more isotropic (in some cases, the transmitted light T may be substantially isotropic, for example).

With reference to FIGS. 1E and 1F, the effect on the transmitted light distribution pattern by a substantially flat lens configuration is depicted. Such a flat interface configuration may have less impact on the distribution pattern of the transmitted light T relative to the incident light I than the lens configurations of FIGS. 1A-1D. For example, in the case where the incident light I is in the form of substantially parallel rays of light, as shown in FIG. 1E, the transmitted light T also may be in the form of substantially parallel rays of light. In the case wherein the incident light I is generated from a point source P, as illustrated in FIG. 1F, the transmitted light T may spread out relative to the incident light I, but to a lesser degree than compared to the lens configuration of FIG. 1D, for example. Such a configuration may be useful where a substantially normal direction of view (e.g., directly in front of a display) is desired.

Of course those skilled in the art would understand that the depictions shown in FIGS. 1A-1F are schematic and the actual light distribution patterns may depend on a variety of factors including, but not limited to, for example, the indices of refraction of the first fluid F1 and/or the second fluid F2 and/or the shape (e.g., the amount of concavity or convexity) of the interface 20. In addition, the various configurations described above may be used in combination to achieve a desired or selected light distribution pattern.

Referring now to FIG. 2, a partial plan view of an exemplary embodiment of a light distribution device 100 which comprises a plurality of deformable lenses 110 that form an array is illustrated. As will be explained in further detail below, the plurality of lenses 110 are deformable such that the lenses are capable of altering their configurations, for example, between convex, concave, and flat, including transitioning in a continuous manner between those configurations. According to some exemplary embodiments, the plurality of lenses 110 (e.g., interface) may be configured such that the shape of each lens 110 may be substantially the same and also may be altered substantially simultaneously. Although FIG. 2 illustrates lenses 110 that have a substantially circular configuration (e.g., cross-sectional shape), it should be understood that the lenses may have various other configurations, including but not limited to, for example, square or rectangular configurations.

In some exemplary embodiments, for example, in applications wherein the light distribution device 100 may be used in conjunction with a LCD panel or other display element in a cockpit or combat vehicle, the array of lenses 110 may be distributed over an area ranging from about 48 square inches to about 80 square inches (e.g., the panels may have dimensions ranging from about 6 inches by 8 inches to about 8 inches by 10 inches), and each lens may have a dimension (e.g., diameter) ranging from about 0.03 inches to about 0.1 inch. when used to distribute light from a backlight. However, those skilled in the art would understand that sizes of the device 100 and/or the lenses 110 may vary depending on the application for which the device 100 is to be used. Moreover, the size of the lenses 110 may depend on the source of the incident light entering the light distribution device 100. By way of example, if the device 100 receives incident light from a backlight and transmits the light to a LCD panel, the diameter of the lenses may be larger than for a device 100 configured to receive incident light transmitted from the LCD panel itself and transmit the incident light to an observer viewing the LCD panel. When placing the light distribution device 100 to receive incident light from the LCD panel, the dimensions of each lens may be approximately the same as the dimensions of corresponding pixels of the LCD panel. Further, as will be explained in more detail below, in exemplary embodiments wherein pressure is used to deform (alter) the shape of the lenses 110, smaller lens diameters may facilitate control over the pressure of a liquid in the lens, and thus control over the alteration of each lens shape.

According to various exemplary embodiments, a light distribution device comprising an array of deformable lenses may be in the form of a plate-like transparent structure comprising a plurality of tubes (e.g., microtubes) open at one end to a first fluid and open at an opposite end to a second fluid.

Figure 3:
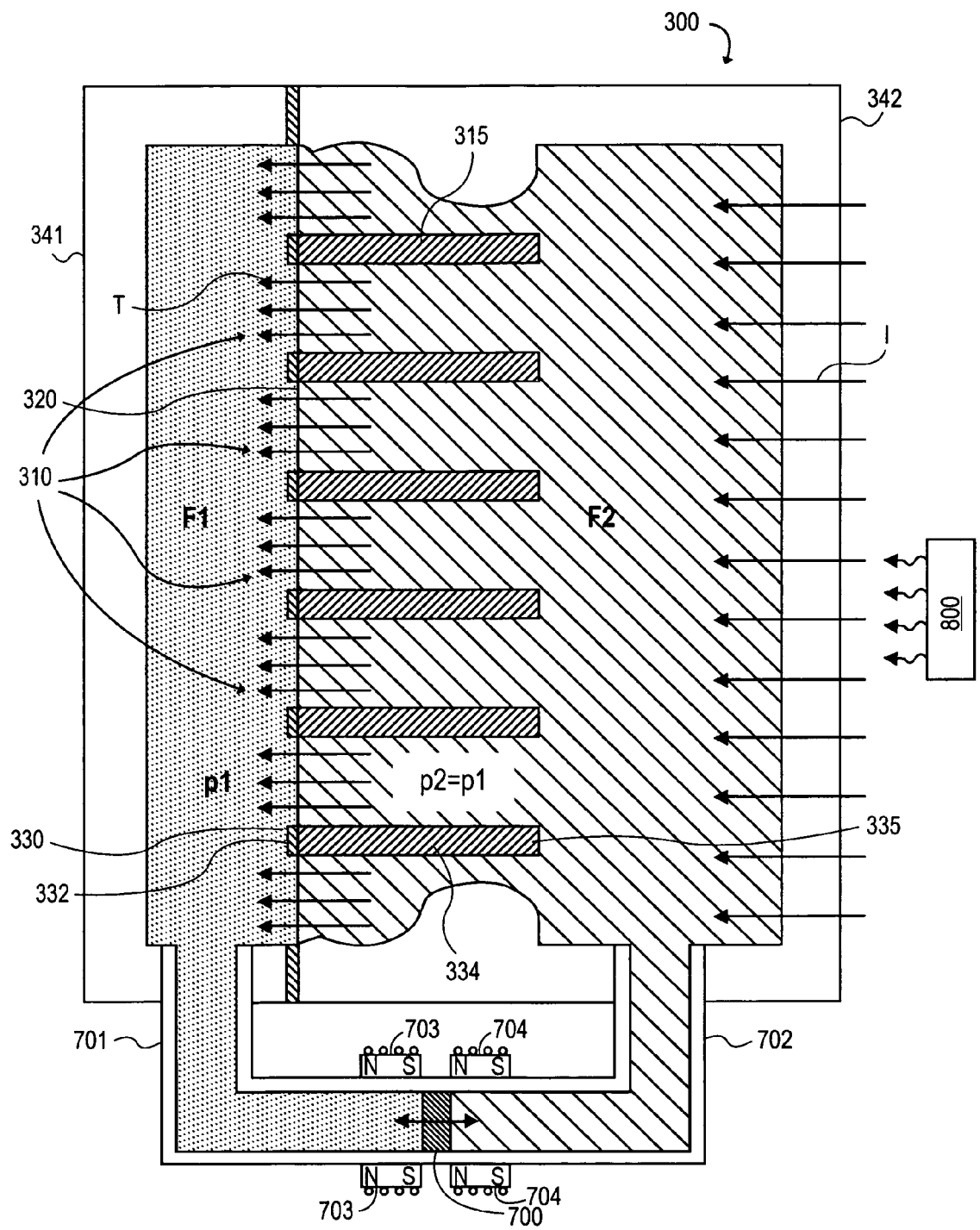
FIG. 3 is a schematic, cross-sectional view of an exemplary embodiment of a light distribution device.

FIG. 3 illustrates a cross-sectional view of an exemplary embodiment of such a light distribution device 300 comprising an array of deformable lenses 310. The light distribution device 300 comprises a plurality of microtubes 315 formed in a plate-like structure. The tubes 315 may be open at a first end 330 to a reservoir containing a first fluid F1 and at a second opposite end 335 to another reservoir containing a second fluid F2. The first fluid F1 and the second fluid F2 may have substantially the same properties and characteristics as those described above. For example, the second fluid F2 may be a liquid having a relatively high surface tension and may fill the tubes 315. The fluids F1 and F2 may be substantially immiscible and the reservoirs isolated from each other via the plate forming the tubes 315. The plate forming the tubes may be sealed by clear sheets 341 and 342 so as to seal the reservoirs. The clear sheets 341 and 342 may be made of, for example, glass, acrylic, plastic or other suitable materials that can transmit light and are compatible with the fluids F1 or F2 with which the sheets 341 and 342 will come into contact. The device 300 may be oriented such that incident light I entering the device passes first through the second fluid F2 and then through the first fluid F1 before being transmitted as light T from the device 300, as shown in FIG. 3.

Figure 4A:
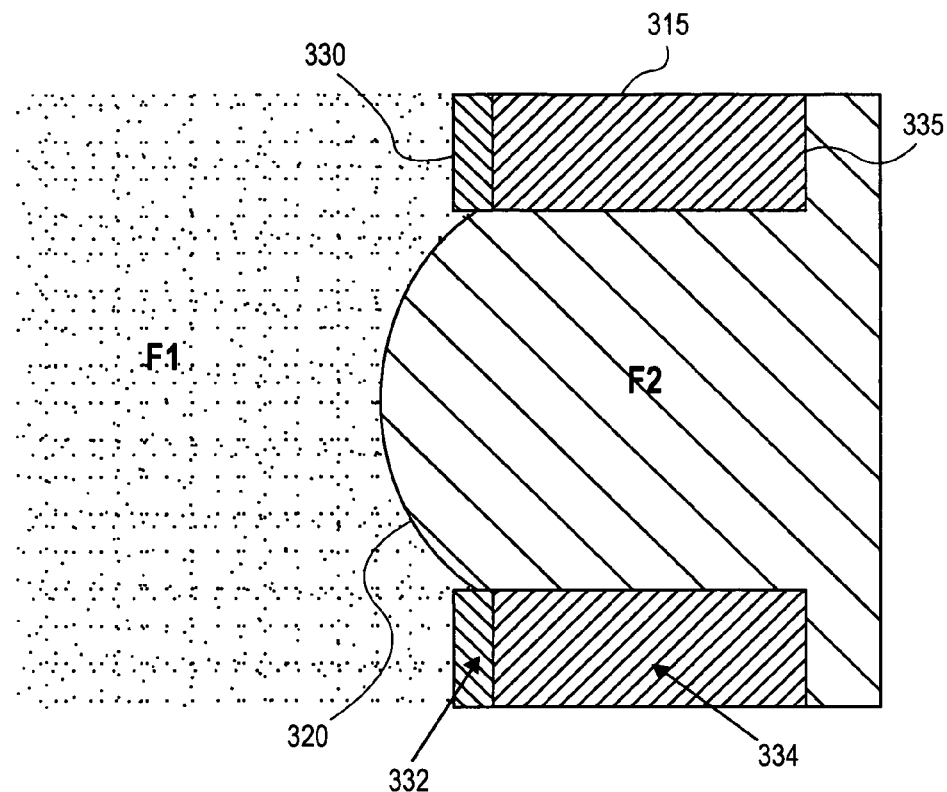
FIGS. 4A and 4B are schematic, cross-sectional views of a lens of the light distribution device of FIG. 3 having a convex configuration and concave configuration, respectively.

With reference to FIG. 4a, which illustrates a close-up, cross-sectional view of a tube 315 of the device 300, the structure of the tubes 315 according to various exemplary embodiments will now be described. According to various exemplary embodiments, each tube 315 may have an inner dimension (e.g., diameter) such that the tubes 315 may be considered microtubes, for example, the inner dimension may range from about 0.03 inches to about 0.1 inch, as discussed above. The distance between the axes of the tubes 315 may be as small as possible depending on manufacturing tolerances and on the application for which the device 300 is being used. In various exemplary embodiments, the distance may range from about ¼ to ⅛ of the tube dimension (e.g., diameter). If, however, the device 300 is being used in front of an image display element, rather than in front of a backlight, for example, the dimensions of the tubes 315 may be similar to the dimensions of the pixels of the image display element and the distance between the axes of the tubes may be about equal to the distance between the centers of the pixels. The dimensions of the tubes 315 may vary in a manner similar to that described above with reference to the dimension of the lenses 110 in FIG. 2. That is, the inner dimension may be chosen depending on factors such as, for example, the type of liquids used, the responsiveness to pressure control that is desired to cause deformation of the interfaces 320 between the first and second fluids F1 and F2, the overall size of the device 300, and/or the application for which the light distribution device 300 is being employed. In particular, the inner dimension of the tubes 315 may be relatively small relative to the surface tension curvature of the fluid F2 which fills the tubes 315. Further, as mentioned above, the tubes 315 may have a variety of configurations (e.g., cross-sectional shapes), including, but not limited to, for example, substantially round, square, or rectangular cross-sections. Thus, the term tube as used herein should not be understood as being limited to a cylindrical structure.

The length of the tubes 315 may range from about 0.1 mm to about 5 mm, for example, from about 1 mm to about 2 mm. As explained further below, in various exemplary embodiments, the length of the tubes 315 may be selected so has to hinder the first fluid F1 from reaching the reservoir containing the second fluid F2 if the relative pressure of the second fluid F2 is decreased sufficiently to cause movement of the first fluid F1 into the tubes 315 and toward the reservoir containing the second fluid F2. In various other exemplary embodiments, as will be further explained with reference to the exemplary device shown in FIG. 6, the lengths of the tubes may be made very small relative to a the inner diameter of the tubes so as to essentially form a screen comprising an array of holes containing the second fluid F2 and forming the deformable lenses.

Referring again to FIG. 4A, a portion 332 of the end 330 of each tube 315 that opens to the fluid F1 may be relatively nonwetting, at least relative to the second fluid F2 such that the second fluid F2 tends to be repelled as it approaches the portion 332. In some exemplary embodiments, however, the portion 332 may be relatively nonwetting relative to both the first fluid F1 and the second fluid F2. The interface I (e.g., meniscus) between the fluids F1 and F2 is established based on the interface surface tension between fluids F1 and F2. According to exemplary aspects, the interface surface tension may be relatively high.

By way of example, to provide a nonwetting end portion 332, the end portion 332 may be coated with a material, such as, for example, Teflon. An inner surface of the remaining portion 334 of the tubes 315 may be substantially wetting relative to the second fluid F2 and may be relatively nonwetting relative to the first fluid F1, or at least less wetting as compared to the second fluid F2, so as to cause the second fluid F2 to fill the tube via capillary action. For example, the interior surface of portion 334 of each tube 315 may be provided with a metal coating, for example. Alternatively, if the inner surface of portion 334 of the tube 315 is relatively nonwetting relative to the second fluid F2, the pressure of the second fluid F2 may be increased so as to move the second fluid F2 into the tube 315. Even in the situation where the inner surface of portion 334 is wetting relative to the second fluid F2, however, it may be necessary to pump the second fluid F2 into the tubes 315 slightly so as to completely fill the tubes 315.

The interior surface of the portion 334 also may be reflective so as to reflect incident light within each tube 315 and thereby maximize the amount of light transmitted from each tube 315. Providing a metal coating on portion 334, as discussed above, may serve to provide both a wetting surface relative to the second fluid F2 and a reflective surface. It also may be possible to provide a metal coating on portion 332 in order to make that portion reflective, however, if such a coating is provided, another nonwetting coating may be provided over the metal coating.

As the pressure of the reservoir containing the second fluid F2 is increased relative to the pressure of the reservoir containing the first fluid F1, the second fluid F2 tends to move in a direction toward the end 330 of the tube 315. At the same time, in regions proximate to the interior surface of the tube 315, the second fluid F2 tends to be attracted (e.g., stick) to the interior surface of the portion 334, which is wetting relative to the second fluid F2, while being repelled by the portion 332, which may be nonwetting relative to the second fluid F2. As a result, the interface (meniscus) 320 may take on a convex configuration (e.g., the surface of interface 320 facing the first fluid L1 is convex), as shown in FIG. 4A.

Figure 4B:
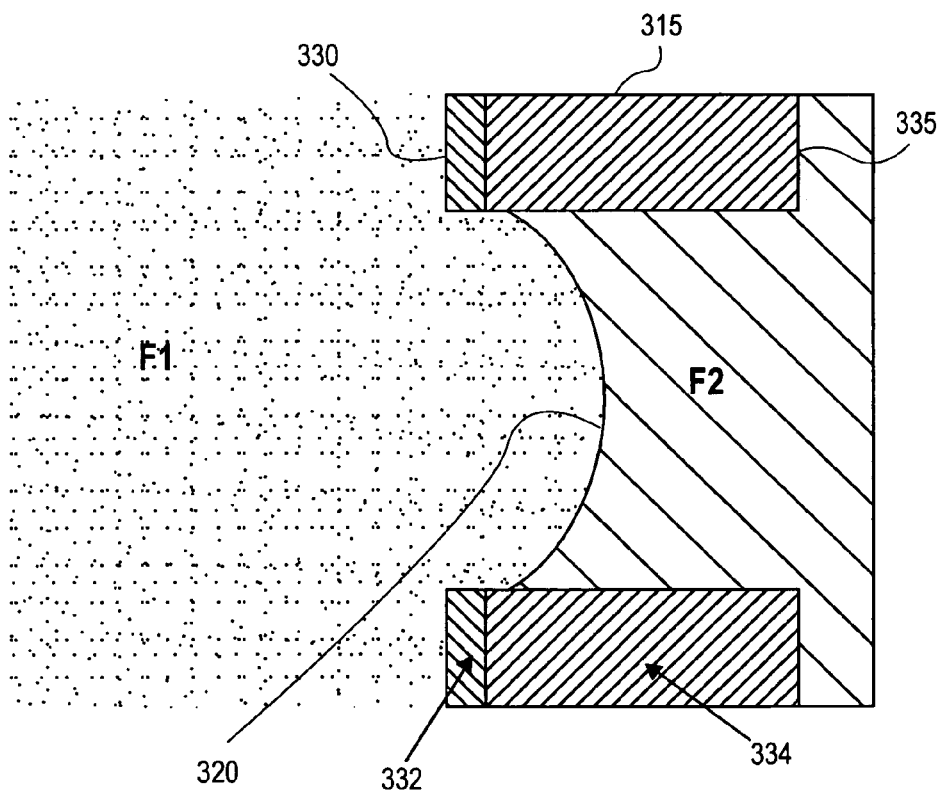

Alternatively, by decreasing the pressure of the second fluid F2 relative to the first fluid F1, the second fluid F2 may still remain attracted to the interior surface of portion 334 of the tubes 315. Thus, the surface tension between the second fluid F2 and the interior surface of portion 334 may resist the pressure tending to withdraw the second fluid F2 from the tubes 315. As a result, the interface 320 may take on a concave configuration (e.g., the surface of the interface facing the first fluid F1 is concave), as depicted in FIG. 4B.

Because the end portion 332 may be relatively nonwetting relative to the first fluid F1, the first fluid F1 proximate the tube inner surface also may be substantially hindered from being drawn into the tubes 315, unless the pressure differential becomes very large (e.g., the pressure of the second fluid F2 is decreased significantly relative to the pressure of the first fluid F1.) If, however, the first fluid F1 should get drawn into the tubes 315, the length of the tubes 315 may assist in preventing the first fluid F1 from breaching into the reservoir containing the second fluid F2. In other words, the first fluid F1 would have to travel the length of the tubes 315 before being able to reach the reservoir containing the second fluid L2. Thus, if the first fluid F1 were to be inadvertently drawn into the tubes 315, the pressure could be adjusted (e.g., the pressure of the second fluid F2 increased relative to the pressure of the first fluid F1) so as to flush the first fluid F1 from the tubes 315.

Figure 6:
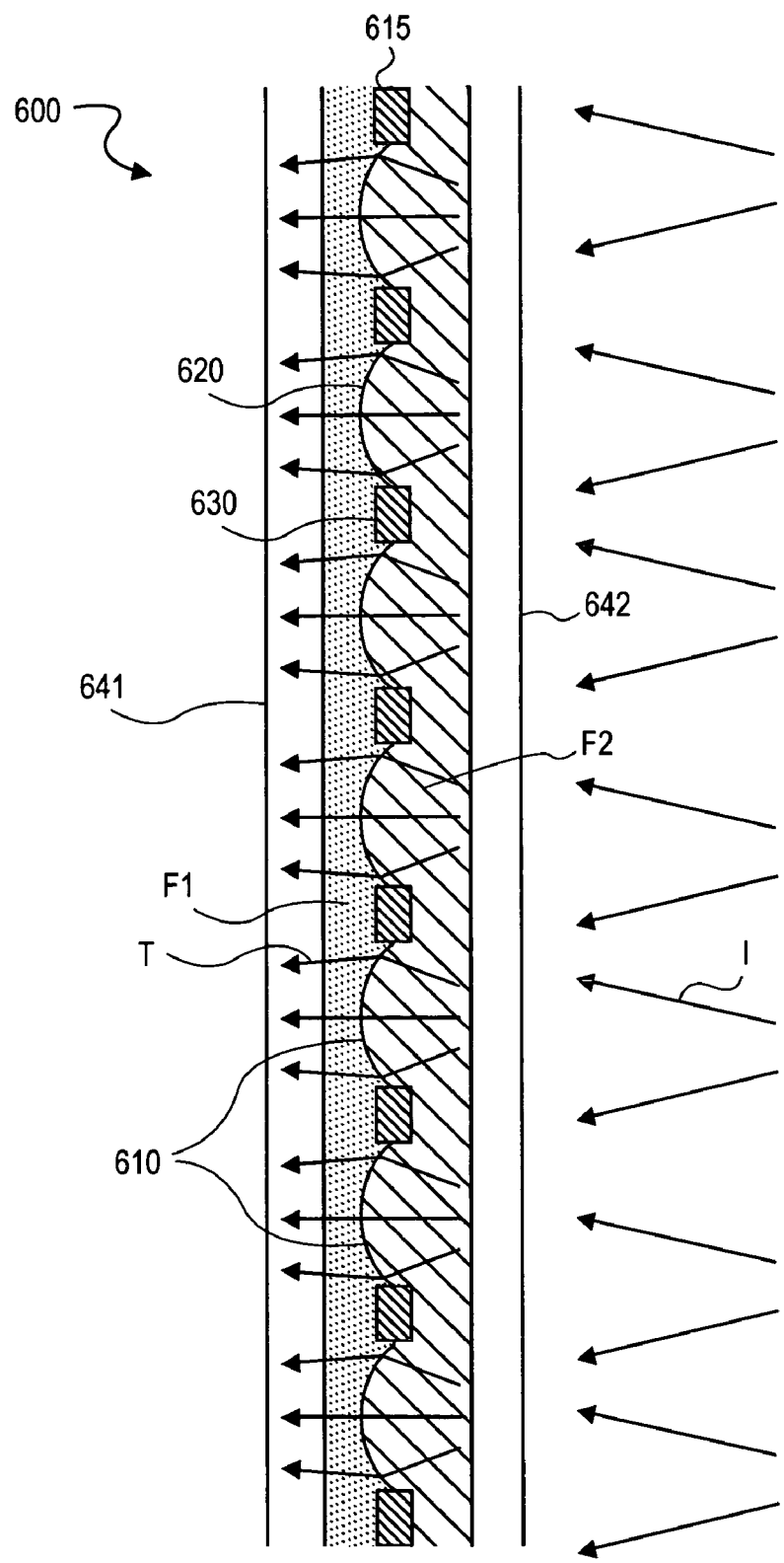
FIG. 6 is a schematic, partial, cross-sectional view of a light distribution device according to another exemplary embodiment.

Although in the exemplary embodiment of the light distribution device depicted in FIG. 3, the tubes 315 have a relatively long length compared to cross-sectional dimension (e.g., inner diameter) of the tubes 315, it is envisioned that a light distribution device according to exemplary embodiments may comprise an array of tubes having relatively short lengths compared to a cross-sectional dimension. FIG. 6 illustrates a partial cross-sectional view of an exemplary embodiment of a light distribution device 600 that includes a plurality of tubes 615 having relatively short lengths relative to the cross-sectional dimension (e.g., inner diameter of the tubes 615). With such a configuration, the light distribution device 600 forms a screen-like structure wherein the tubes 615 provide the holes of the screen, which serve to hold the second fluid F2 to create the deformable lenses 610. FIG. 6 is a partial view of the device 600 and therefore various components are not illustrated. It should be understood that the device 600 may include components similar to those provided in conjunction with the device 300 illustrated in FIG. 3. By way of example, a tri-stable piston and clear sheets 641 and 642, for sealing the device 600, similar to elements 700, 341, and 342 of the device 300, may be provided in conjunction with the device 600 according to exemplary embodiments.

In the exemplary embodiment of FIG. 6, the screen may be either wetting or nonwetting. For example, if the first fluid F1 is a gas and the second fluid F2 is a liquid, a screen that is substantially wetting (e.g., the surfaces of the relatively short-length tubes 615 are wetting) relative to the second fluid F2, a modifiable concave interface (not shown) may be formed by decreasing the pressure of the second fluid F2 relative to the pressure of the first fluid F1. If, on the other hand, the screen is relatively nonwetting relative to the second fluid F2, a modifiable convex interface 620 (as shown in FIG. 6) may be formed by increasing the pressure of the second fluid F2 relative to the pressure of the first fluid F1, with the first fluid F1 being a gas and the second fluid F2 being a liquid. If, however, both of the first and second fluids F1 and F2 are liquids, the screen may be relatively nonwetting relative to both of the fluids F1 and F2 and the pressure differential between the first and second fluids F1 and F2 may be altered in a manner similar to that described above with reference to FIGS. 4A and 4B so as to modify the interface 620 between the fluids and alter the interface configuration between flat, convex, and concave, as desired.

Like the device 300 of FIG. 3, therefore, by substantially simultaneously altering the interfaces 620, the distribution pattern of transmitted light T from the device 600 may be selectively altered relative to the incident light I distribution pattern.

Thus, in the various exemplary embodiments of light distribution devices described above, by modulating the relative pressures of the first fluid F1 and second fluid F2 by amounts such that the surface tension forces are not overcome by the pressure forces, the configuration of the interface between the fluids F1 and F2 may be altered as desired, for example, between convex, concave, and flat configurations, and in a continuous manner from one configuration to another. Further, the degree of concavity or convexity of the interface configuration may also be modified by modulating the relative pressures between the first fluid F1 and the second fluid F2. When the pressures of the first fluid F1 and the second fluid F2 are substantially the same, the interface may have a substantially flat configuration like interface 320 shown in FIG. 3. For the exemplary embodiment of FIG. 3, the relevant surface tension boundary is the interface between the nonwetting portion 332 and the wetting portion 334.

Figure 7A:
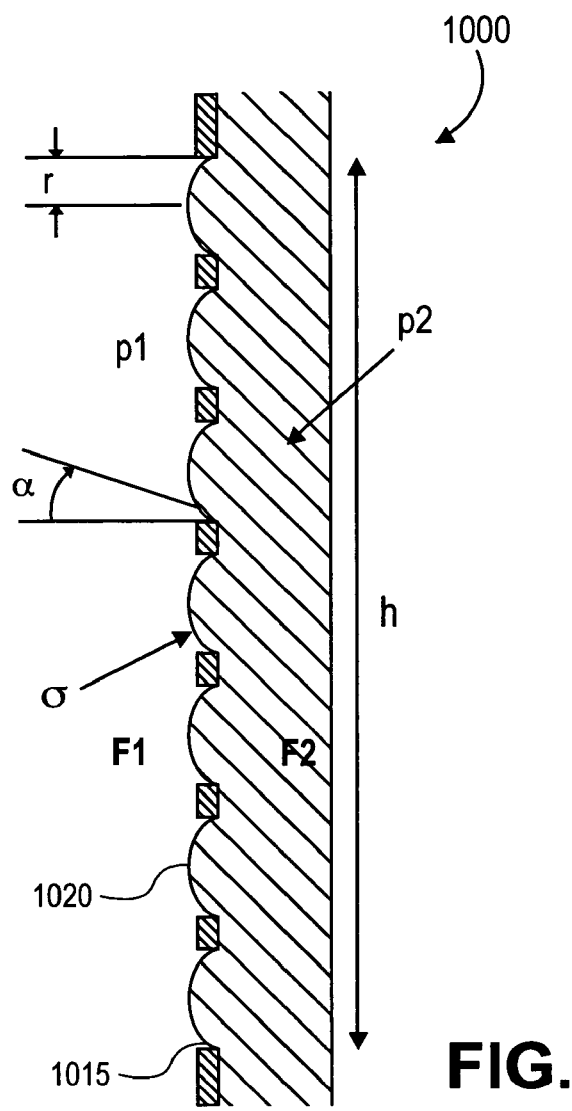
FIG. 7A is a partial cross-sectional view of a light distribution device according to yet another exemplary embodiment.
Figure 7B:
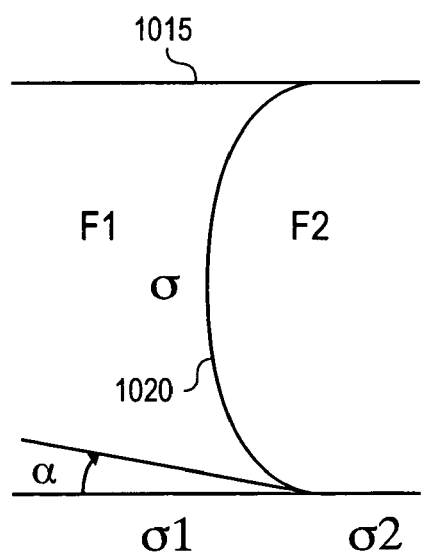
FIG. 7B is a cross-sectional view of a hole of the device of FIG. 7A.

To assist in explaining some of the principles of operation of the light distribution device embodiments described herein, set forth below are some governing equations for a light distribution device formed by a relatively nonwetting plate 1000 shown in FIG. 7A and similar in structure to the device of FIG. 6, e.g., defining a plurality of small holes 1015 forming a screen. First, assuming no pressure differential between the first fluid F1 and the second fluid F2, the general relationship governing the interface surface tension σ is provided by the Young-Laplace equation. Thus, with reference to FIG. 7B, which depicts a single hole 1015 of the device 1000, $$\sigma_2 - \sigma_1 = \sigma \cos(\alpha)$$

where σ is the interface surface tension between the fluids F1 and F2, $\sigma_1$ is the interface surface tension between the inner surface of the hole 1015 and the first fluid F1, $\sigma_2$ is the interface surface tension between the inner surface of the hole 1015 and F2, and α is the contact angle between the interface 1020 and the wall.

Additionally, with reference again to FIG. 7A, $$\cos(\alpha) = r(p_2 - p_1)/2\sigma, \text{ with } p_2 - p_1 >> (\rho_2 - \rho_1)gh$$

In the above equations, $p_1$ is the pressure of fluid F1, $p_2$ is the pressure of fluid F2, α is the contact angle between the interface 1020 and the inner surface defining the holes 1015, σ is the interface surface tension between the fluids F1 and F2 (which may be about 52 dyne/cm for water and oil), h is the height of the screen, and r is the radius of the holes 1015 (assuming the holes 1015 are round). Thus, as can be seen by the above equations, and as further explained below, with no pressure differential, $p_2 - p_1$ equals zero and the contact angle α is 90 degrees, yielding a flat interface 1020 between the fluids F1 and F2. For a positive value of $p_2 - p_1$ (e.g., where the pressure of the second fluid F2 is increased relative to the pressure of the first fluid F1), α is less than 90 degrees and a convex lens shape occurs, and for a negative value of $p_2 - p_1$ (e.g., where the pressure of the second fluid F2 is decreased relative to the pressure of the first fluid F1), α is less than 90 degrees and a concave lens shape occurs. Moreover, in order for gravity to have a negligible effect on the lens curvature, the pressure differential, $p_2 - p_1$, should be much greater than the hydrostatic pressure, $(\rho_2 - \rho_1)gh$. To achieve a large pressure differential, the radius of the holes (or other dimension depending on the configuration of the hole) should be relatively small to achieve capillarity of the second fluid F2 such that cos(α) remains less than 1 thereby preventing the second fluid F2 from simply flowing through the holes 1015 (or tubes 315).

Figure 5A:
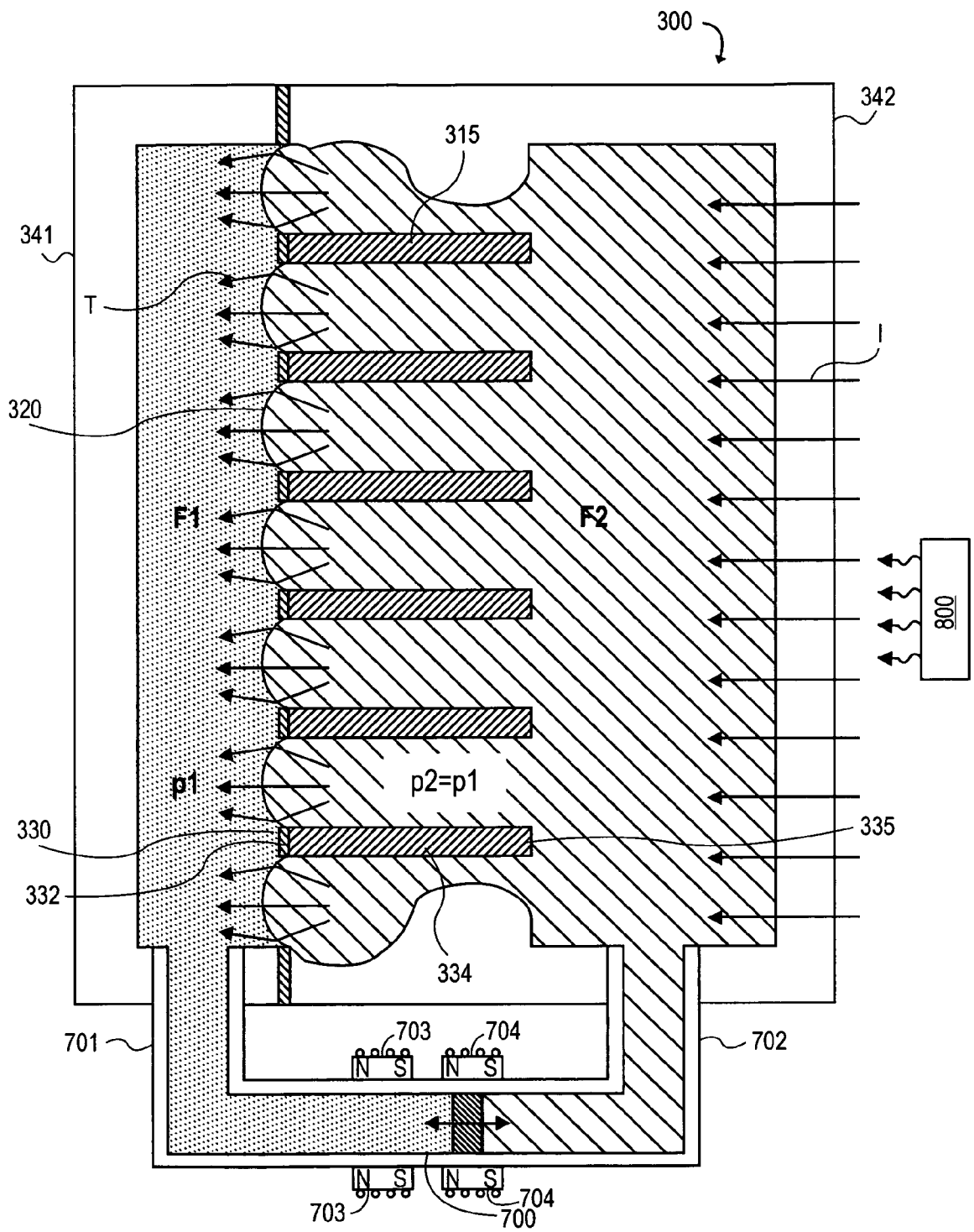
FIGS. 5A and 5B are schematic, cross-sectional views of the light distribution device of FIG. 3 respectively configured for providing a relatively narrow angular range light distribution pattern and a relatively wide angular range light distribution pattern according to an exemplary embodiment.

Provided the tubes 315 or 615 are relatively small in size, by changing the pressure of the reservoir containing the second fluid F2, the second fluid F2 filling each tube 315 or 615 will have substantially the same pressure as the reservoir. By modulating the reservoir pressure, the shape of each of the interfaces 320, 620 of the lenses 310, 610 may be substantially the same and may be altered substantially simultaneously. Thus, as shown in the exemplary embodiment of FIG. 5A, which illustrates the light distribution device 300 including tubes 315, by increasing the pressure of the reservoir containing the second fluid F2 such that the second fluid F2 has a pressure higher than the first fluid F1, each of the interfaces 320 may be altered so as to have a convex configuration. In this way, therefore, a light source 800 generating parallel incident light I may be gathered inwardly (e.g., focused) when transmitted from the device 300 as transmitted light T. In the configuration of FIG. 5A, therefore, the transmitted light T will provide illumination that is brightest toward a central portion of the device 300 and decreases toward the edges of the device.

Figure 5B:
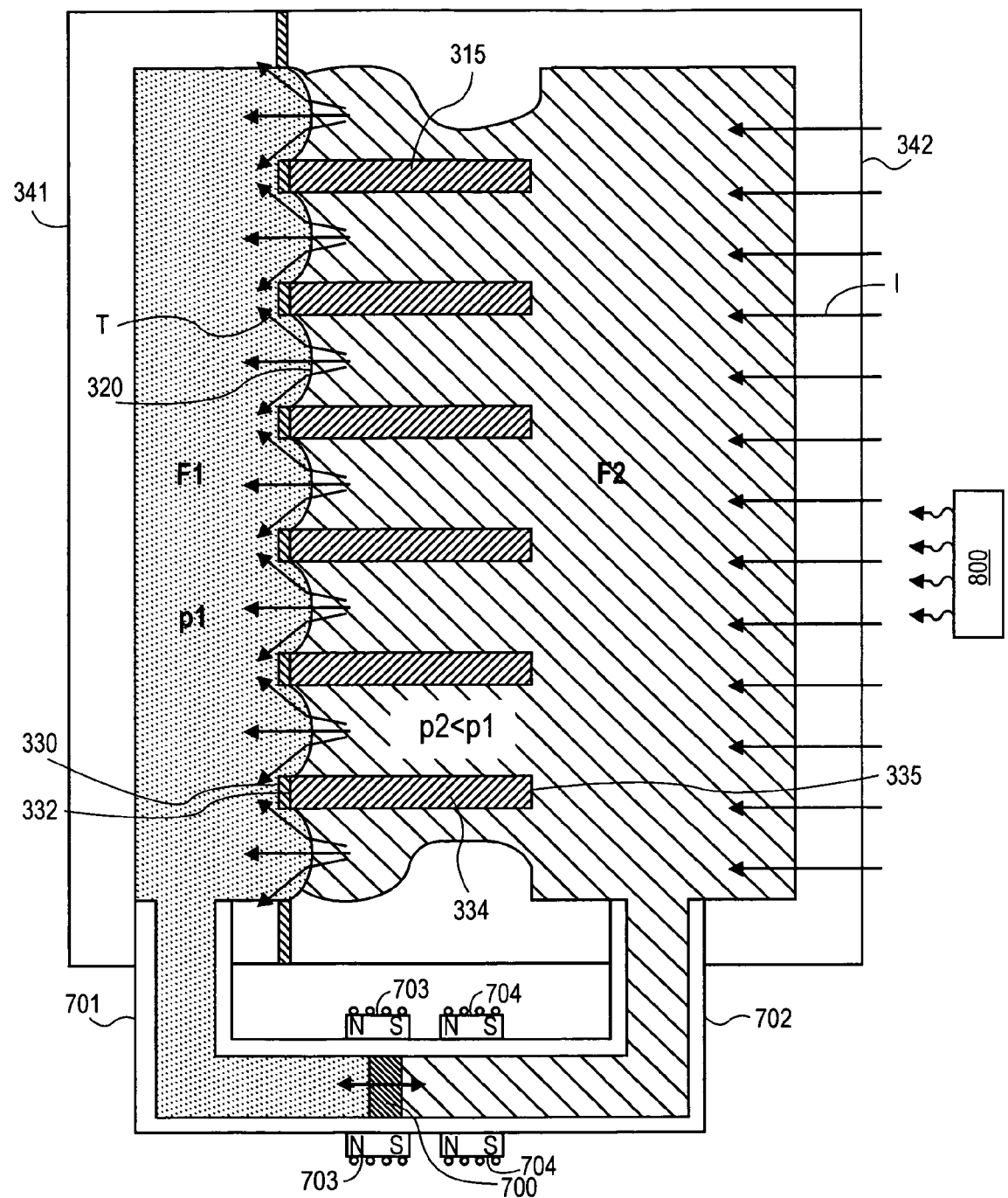

Referring now to FIG. 5B, by decreasing the pressure of the reservoir containing the second fluid F2 such that the second fluid F2 has a pressure lower than the first fluid F1, each of the interfaces 320 may substantially simultaneously take on concave configurations, as illustrated in FIG. 5B. In this configuration, the device 300 may spread (e.g., increase the angular distribution of) parallel incident light I so as to transmit light T in a more isotropic manner. In this configuration, the transmitted light T provides illumination toward a central portion of the device 300 that is less bright than in the configuration of FIG. 5A, however, the brightness toward the edges of the device 300 is increased, thereby increasing off-axis visibility.

Those of ordinary skill in the art will understand that the light source 800 may supply incident light I in a variety of patterns other than the parallel pattern illustrated in FIGS. 3, 5A, and 5B including, for example, a substantially isotropic pattern (e.g., from a point source) or any other type of pattern. By way of example, FIG. 6 illustrates incident light I from a plurality of point sources. Such an incident light pattern may occur when the light distribution device is placed in front of a transmissive display element, such as an LCD panel, for example, such that each deformable lens is substantially aligned with a pixel of the display element. Moreover, the distribution pattern of the transmitted light T will depend on the pattern of the incident light I. Regardless of the distribution pattern of the incident light I, however, the convex configuration of the interfaces 320 of FIG. 5A will tend to narrow the angular distribution pattern of (e.g., focus) the transmitted light T and the concave configuration of the interfaces 320 of FIG. 5B will tend to widen the angular distribution pattern of (e.g., make more isotropic) the transmitted light T.

The pattern of the incident light I may depend on the type of light source supplying the incident light I. As discussed above, suitable light sources, include, but are not limited to, for example, incandescent lights, light emitting diodes (LEDs), organic light emitting diodes (OLEDs), cold cathode fluorescent lights, and any other type of light source. Further, the light source from which the incident light is passed to a light distribution device (e.g., device 300 or 600) may be light transmitted by and/or generated from, for example, backlight, a LCD panel, a plasma panel, a CRT monitor, a flashlight, and/or any other light source for which it may be desirable to alter the light distribution pattern, for example, between relatively narrow and relatively wide angular distribution patterns.

It will be understood by those having skill in the art that a light distribution device 600 may also be used in lieu of the light distribution device 300 illustrated in FIGS. 5A and 5B to alter the transmitted light distribution pattern. As with the device 300 and in a manner similar to that described above, by modulating a relative pressure between the first and second fluids F1 and F2, the interfaces 620 of the light distribution device 600 may substantially simultaneously be altered so as to alter a light distribution pattern of the transmitted light relative to incident light entering the device 600.

Various mechanisms may be used to alter the pressure differential between the first fluid F1 and the second fluid F2. Suitable mechanisms for altering the pressure may be chosen from piston systems (including, for example, bi- or tri-stable piston systems), diaphragms (including, for example, bi- or tri-stable diaphragms), microfluidic pumps, electroosmotic pumps, and piezoelectric pumps. Other techniques for altering the pressure may include techniques relying on electric forces such as electrowetting techniques and/or electrophoretic techniques (e.g., electrowetting and/or electrophoretic pumps). In addition, one skilled in the art will understand that other fluid control mechanisms may be provided, such as piping, valves, and the like. These components may be provided for routing fluids F1 and/or F2 or for providing isolation control.

It is envisioned that the devices 300 and 600 may be supplied with various valves and/or ports to be placed in flow communication with various pressure control mechanisms. It also should be understood that the pressure of the reservoir containing the first fluid F1 and/or the pressure of the reservoir containing the second fluid F2 may be modulated, and the description and illustrations provided herein showing modulation of the pressure of the reservoir containing the second fluid F2 is exemplary only. Those having ordinary skill in the art would understand that a pressure control mechanism could be provided in flow communication with one or both of the reservoirs containing the first fluid F1 and the second fluid F2.

In various exemplary embodiments, a tri-stable piston mechanism may be used for modulating the pressure. The exemplary embodiment of the light distribution device 300 of FIGS. 3 and 5 illustrates the use of a tri-stable piston 700 for modulating the pressure differential between the first fluid F1 and the second fluid F2. As illustrated, the reservoirs containing the first and second fluids F1 and F2 may be isolated from one another and may be in flow communication with conduit branches 701 and 702. The conduits branches 701 and 702 join together and a piston 700 separates the fluids F1 and F2 from mixing together where the conduit branches 701 and 702 join. The piston 700 may be a ferromagnetic piston and operable via two pairs of electromagnets 703 and 704, as shown. The electromagnets may be controlled so as to move the piston 700 in the direction of the arrows, as desired, to within the pair of electromagnets 703 (e.g., as shown in FIG. 5B) or within the pair of electromagnets 704 (e.g., as shown in FIG. 5A). In another state, when the electromagnets are inactive, the piston may move into an idle position (e.g., as shown in FIG. 3) determined based on the relative surface tensions of the fluids F1 and F2 and the resulting pressure balance. Moving the piston 700 in the directions of the arrows in FIG. 3 modulates the relative pressures of the first and second fluids F1 and F2.

According to yet other exemplary embodiments, one or both of the first fluid F1 and the second fluid F2 may be circulated through fluid lines, etc. connected to a light distribution device so as to provide a cooling function. For example, by circulating one or both fluids F1 and F2 contained in their respective reservoirs, the light source, for example, an LCD panel, may be cooled. Such circulation may be accomplished by providing appropriate fluid lines connected to the reservoirs and/or pumps that act separately from pressure control mechanism. As an alternative to the use of pumps, convection also may be used to achieve circulation of one or both fluids F1 and F2. Those having skill in the art will understand a variety of ways to achieve circulation of one or both fluids F1 and F2.

Various techniques known to those skilled in the art may be used to fabricate the light distribution devices according to exemplary embodiments disclosed herein. For example, techniques such as laser machining, photoetching, drilling, and/or stamping may be utilized to create the plates comprising an array of tubes. Additionally, conventional techniques such as those used for microchannel plate assembly, for example, that utilize bundles of glass fibers to fabricate microchannels and the like may be used to form the tubes of the plate.

According to various exemplary embodiments, the light distribution devices and methods according to aspects of the invention may be programmable such that the appropriate pressure differential is automatically established to achieve a desired output light distribution pattern. For example, the light distribution devices and methods may be configured so as to permit differing users of the device (e.g., observers viewing images from a display element, users of a flashlight, etc.) to input, for example, into a processor or some other interface with the device, a desired output distribution pattern. Users may interface such a device in several ways. For example, the users may utilize controls, such as buttons, knobs, and the like, that are provided on the light distribution device. Alternatively, the light distribution device may be controlled using a software application running on a computer or processor that is coupled to the device.

Once set, the light distribution device may be programmed and controlled automatically so as to control the pressure differential between the first and second fluids F1 and F2. In an exemplary aspect, a key pad, keyboard, or the like, may be used in conjunction with a controller in communication with the light distribution device. A unique code, for example, an alphanumeric code, or button may be associated with particular output distribution patterns. Once the desired distribution pattern is programmed to be associated with a particular button and/or code, a user may press the appropriate button or code, which in turn will control the pressure so as to cause the light distribution device to transmit light in an output pattern associated with that button and/or code.

It should be understood that sizes, configurations, numbers, and positioning of various structural parts and materials used to make the above-mentioned parts are illustrative and exemplary only. One of ordinary skill in the art would recognize that those sizes, configurations, numbers, positioning, materials, and/or other parameters can be changed to produce different effects, desired characteristics, and/or to achieve different applications than those exemplified herein. In particular, the drawings illustrate schematic light distribution devices; the number of lenses, size of the lenses, overall size of the device, types of liquids used, and other structural dimensions and configurations may vary depending on the desired application and operation of the device. It also will be understood by those skilled in the art that the light distribution patterns illustrated in the figures represent cross-sectional views and that the light is distributed in three dimensions through the liquid lenses of the light distribution devices.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations. Other embodiments of the invention will be apparent to those skilled in the art from consideration of the specification and practice of the invention disclosed herein.

The invention claimed is:

1. A device for distributing light, comprising:
   a plurality of liquid optical lenses comprising a first liquid and a second liquid;
   wherein each liquid optical lens has a configuration that is based on a pressure differential between the first liquid and the second liquid, and
   wherein the pressure differential is selectively modulatable so as to selectively alter the configuration of each lens substantially simultaneously.

2. The device of claim 1, wherein the pressure differential is selectively modulatable to alter each liquid optical lens between convex, concave, and flat configurations.

3. The device of claim 1, wherein the pressure differential is selectively modulatable to selectively alter a degree of concavity or convexity of each lens.

4. The device of claim 1, wherein the device is configured to transmit incident light from at least one of backlights, LEDs, OLEDs, incandescent light sources, LCD panels, plasma monitors, CRT monitors, and fluorescent lights sources.

5. The device of claim 1, wherein the pressure differential is selectively modulatable such that each of the plurality of liquid optical lenses has substantially the same configuration.

6. The device of claim 1, further comprising a flow control mechanism configured to circulate the first liquid and the second liquid.

7. The device of claim 1, wherein each liquid optical lens comprises a tube for selectively housing one of the first liquid and the second liquid.

8. The device of claim 7, wherein each tube comprises a reflective interior surface portion.

9. The device of claim 7, wherein an interior surface portion of the tube is configured to attract one of the first liquid and the second liquid.

10. The device of claim 7, wherein an end portion of the tube is configured to repel one of the first liquid and the second liquid.

11. The device of claim 1, wherein the first liquid and the second liquid at least partially define an interface forming the lens, and wherein a shape of the interface is alterable in response to modulating the pressure differential.

12. The device of claim 1, wherein the first liquid and the second liquid are substantially immiscible with each other.

13. The device of claim 1, wherein each liquid lens comprises a tube substantially filled with the second liquid, the second liquid having a higher surface tension than the first liquid.

14. The device of claim 13, wherein the second liquid has a higher index of refraction that the first liquid.

15. The device of claim 13, wherein an end portion of each tube opens to a reservoir containing the first liquid.

16. The device of claim 15, wherein each tube comprises another, opposite end opening to an additional reservoir containing the second liquid.

17. The device of claim 16, wherein each tube comprises another, opposite end opening to an additional reservoir containing the first liquid.

18. The device of claim 1, wherein at least some of the plurality of lenses comprise a flexible membrane in contact with one of the first liquid and the second liquid.

19. The device of claim 1, further comprising a controller in communication with the first liquid and the second liquid and configured to modulate the pressure differential.

20. A method for distributing light, the method comprising:

transmitting the light through a plurality of liquid optical lenses comprising a first liquid and a second liquid; and selectively modulating a pressure differential between the first liquid and the second liquid to alter a configuration of each liquid optical lens substantially simultaneously.

21. The method of claim 20, wherein selectively modulating the pressure differential comprises selectively modulating the pressure differential to vary the distribution pattern between a substantially isotropic pattern and a substantially focused distribution pattern.

22. The method of claim 20, wherein selectively modulating the pressure differential comprises selectively modulating the pressure differential to vary the distribution pattern between a relatively wide angular distribution and a relatively narrow angular distribution.

23. The method of claim 20, further comprising receiving an input that indicates a desired distribution pattern from the plurality of liquid optical lenses and selectively modulating the pressure differential based on the input.

* * * * *

UNITED STATES PATENT AND TRADEMARK OFFICE
CERTIFICATE OF CORRECTION

PATENT NO. : 7,382,544 B2
APPLICATION NO. : 11/350952
DATED : June 3, 2008
INVENTOR(S) : Andrei Cernasov It is certified that error appears in the above-identified patent and that said Letters Patent is hereby corrected as shown below:

Column 14, line 51, "that" should be changed to --than--.

Signed and Sealed this

Twenty-third Day of September, 2008

JON W. DUDAS
*Director of the United States Patent and Trademark Office*